Dec. 10, 1968  C. E. GALLES  3,416,054
MOTOR CONTROL APPARATUS INCLUDING SEQUENTIAL INTERVAL
GENERATING MEANS FOR ALTERNATELY ENABLING MOTOR
ROTATION IN FORWARD AND REVERSE DIRECTIONS
Filed May 10, 1966  5 Sheets-Sheet 1

INVENTOR.
CHARLES E. GALLES,
BY J. K. Haskell
ATTORNEY.

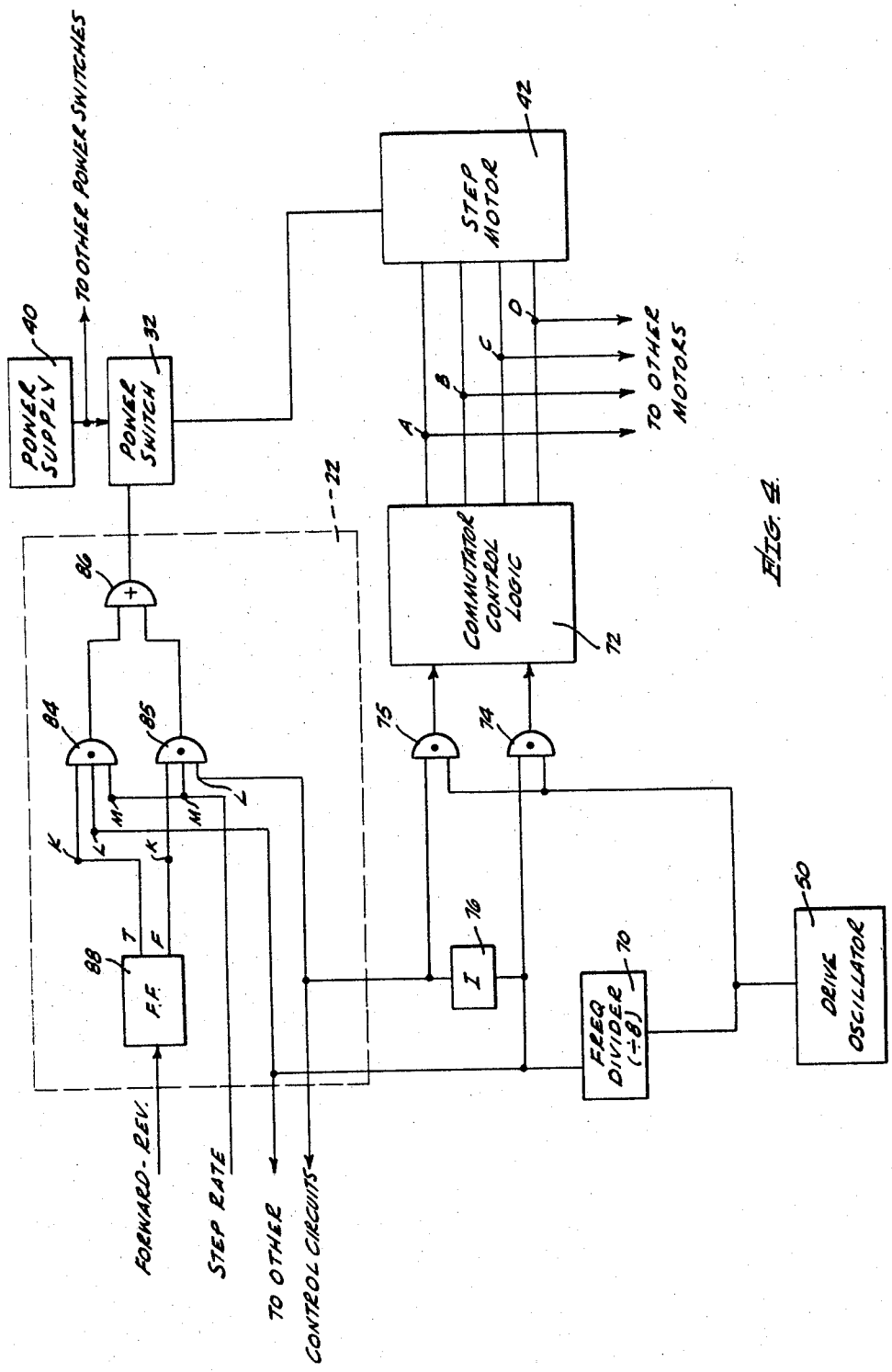

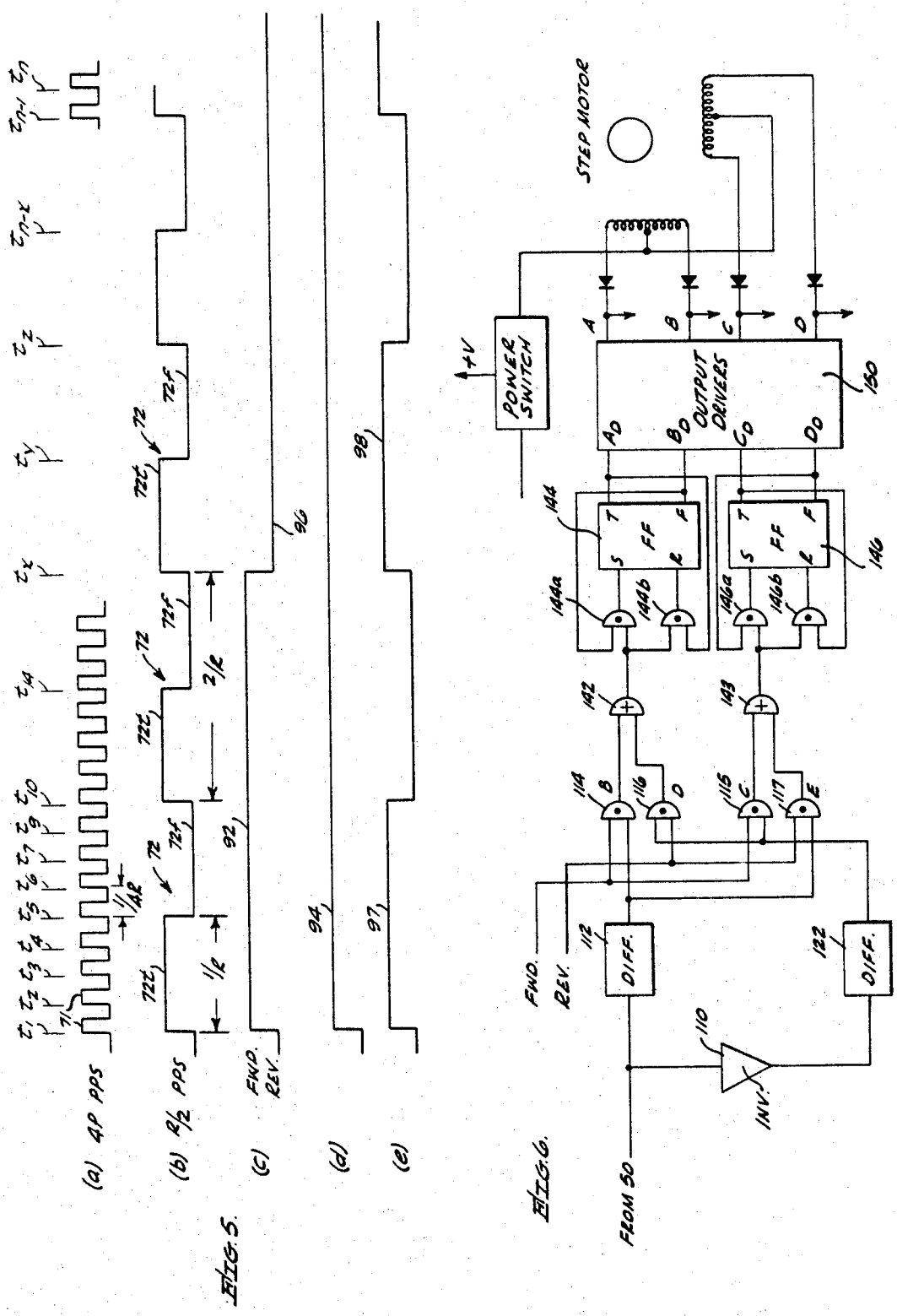

United States Patent Office 3,416,054
Patented Dec. 10, 1968

3,416,054
MOTOR CONTROL APPARATUS INCLUDING SEQUENTIAL INTERVAL GENERATING MEANS FOR ALTERNATELY ENABLING MOTOR ROTATION IN FORWARD AND REVERSE DIRECTIONS
Charles E. Galles, Inglewood, Calif., assignor to Hughes Aircraft Company, Culver City, Calif., a corporation of Delaware
Filed May 10, 1966, Ser. No. 549,069
7 Claims. (Cl. 318—138)

This invention relates to a process control system and more particularly to apparatus for controlling motors employed therein.

The automatic control of industrial processes by computers has by now become well established. At an automatic control installation signals are transmitted to a central computer from various locations in the plant where the process is being controlled. These signals represent what is occurring in the controlled process at the location at which these signals are generated. The computer performs computational operations on the data, represented by these signals and then sends out control signals to apparatus which responds thereto to either alter the process or maintain it in response to the control signals from the computer.

Where the control operation requires the operation of valves or other similar mechanical equipment, motors are employed of a type generally called "stepping motors" which rotate an increment of a complete cycle at a time, generally referred to as a step. The length of arc of each step may be anywhere up to $\frac{1}{200}$ of a complete revolution. Accordingly, these motors provide a rather precise mechanism which can be precisely controlled by the computer to operate a valve or other apparatus.

The computer controlling the stepping motors determines in what direction each motor is to step, namely whether it should step in a forward or reverse direction and also the rate at which adjustment is desired; that is, the rate at which the motor is to step in order to adjust the apparatus being controlled to the desired position. In present day process control systems, computer techniques have been developed for providing each control motor with signals hereafter referred to as stepping signals, at different rates to energize it to step at any one of a plurality of rates. These are often referred to as velocity patterns.

The present technique for generating velocity patterns, for driving each of a plurality of motors in either a forward or reverse direction and at a selected rate, requires a separate power supply and a separate relatively expensive motor commutating control unit for each motor. The function of each commutating control unit is to control the direction of motor rotation as a function of the signals from the computer. Since process control systems generally incorporate a great number of motors, the need of a separate motor commutating control unit for each motor greatly increases the initial cost of such a system as well as the problems of system maintenance.

Accordingly, an object of this invention is the provision of a novel motor control arrangement in a process control system.

Yet another object of the present invention is the provision of a simplified motor control arrangement in a process control system.

Still another object of the present invention is the provision of a motor control arrangement in a process control system which is more economical than those employed heretofore.

A further object is to provide a simplified motor control arrangement in a process control system in which a single motor commutating control unit is employed to control any number of motors.

These and other objects of the invention are achieved by providing a means which defines a sequence of stepping time intervals, the duration of each interval being sufficient for any of the motors to step a full step in either a forward or reverse direction. All the motors are connected so that during every odd interval in the sequence, all are rotatable in a forward direction and during every even interval they are rotatable in a reverse direction. However, whether a motor rotates at all and if so in what direction and at what rate depends on control signals supplied from computer to a logic control circuit associated with each motor. These signals include direction indicating signals and stepping signals. For example for a motor to rotate in a forward direction at maximum velocity, a forward direction indicating signal and a stepping signal is supplied to its logic control circuit during each odd stepping time interval, so that the particular motor is energized to step forward during each interval when all motors are connected so that they may step forward. On the other hand, if a motor is to step in a reverse direction at a different velocity, such as $\frac{1}{10}$ of the maximum velocity, its logic control circuit is supplied with a reverse direction indicating signal. However, the stepping signal is supplied during every 10th even interval so that stepping occurs at a rate of velocity which is $\frac{1}{10}$ of the maximum stepping velocity.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 4 is a block diagram useful in explaining the operation of a portion of the circuitry shown in FIGURE 1;

FIGURE 5 is a diagram of waveforms useful in explaining the circuitry shown in FIGURE 4;

FIGURE 6 is a block diagram of one embodiment of the commutator control logic 72, shown in FIGURE 4.

Figure 1:
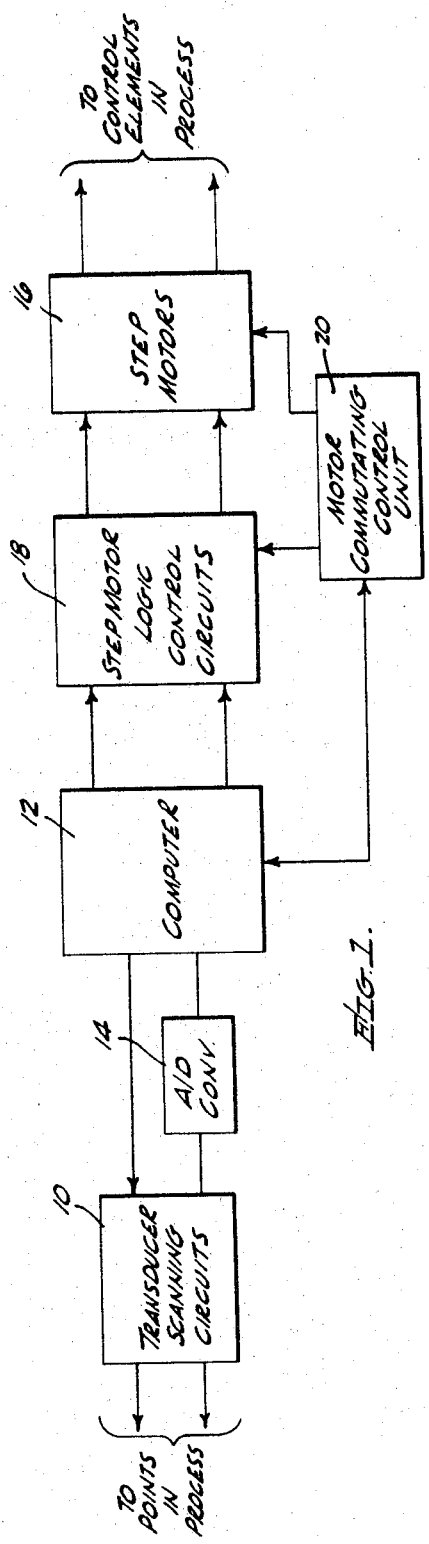
FIGURE 1 is a block diagram of a process control system incorporating the motor control apparatus of the present invention.

Referring now to FIGURE 1 of the drawings, there may be seen a simplified block diagram of a process control arrangement, exemplifying the environment wherein the embodiment of the invention may be employed. Assume, for example, that the process being controlled is a chemical process wherein a plurality of control valves or elements such as potentiometers, spaced at various positions over the area over which the process is being effectuated, are controlled to, in turn, control the flow of fluids or gases in the process. The condition at each of the steps of the process, which is to be controlled, is usually detected by some type of sensing element and a transducer converts the sensing element output to a representative electrical signal. Thus, since the process being controlled normally has a plurality of transducers, these are scanned by some type of transducer scanning circuits 10, whose rate of scanning as well as rate of repetition is determined by a controlling computer 12. The output of each one of the scanned transducers which is usually in analog form is converted into digital signals by an analog-to-digital converter 14, the output of which is fed to the computer 12.

The computer proceeds to process the incoming data or signals. As a result of the processing, the computer issues instructions or control signals used to control the rotation of the step motors 16 which in turn results in the control of the elements employed in the process. The control signals from the computer are supplied to step motors 16 through step motor logic control circuits 18 which includes a plurality of logic control circuits each of which controls the direction and rate of rotation of another motor. In accordance with the present invention, a motor commutating control unit or apparatus 20 is included which is synchronized with the computer 12 and coupled to logic control circuits 18 and motors 16. The function of unit 20, as will be explained hereafter in detail, is to energize the motors during successive time intervals so that during alternate intervals, all the motors are energizable to rotate or step in the same direction.

It will be appreciated that the explanation of the process control arrangement is a considerably simplified one. It is given, however, for the purpose of orientation within the environment in which this invention is employed, rather than for the purpose of providing details of a process control computer arrangement. There is a considerable amount of literature published, both in the form of patents, as well as magazines and books which describe in detail process control systems and computers used in them.

Figure 2:
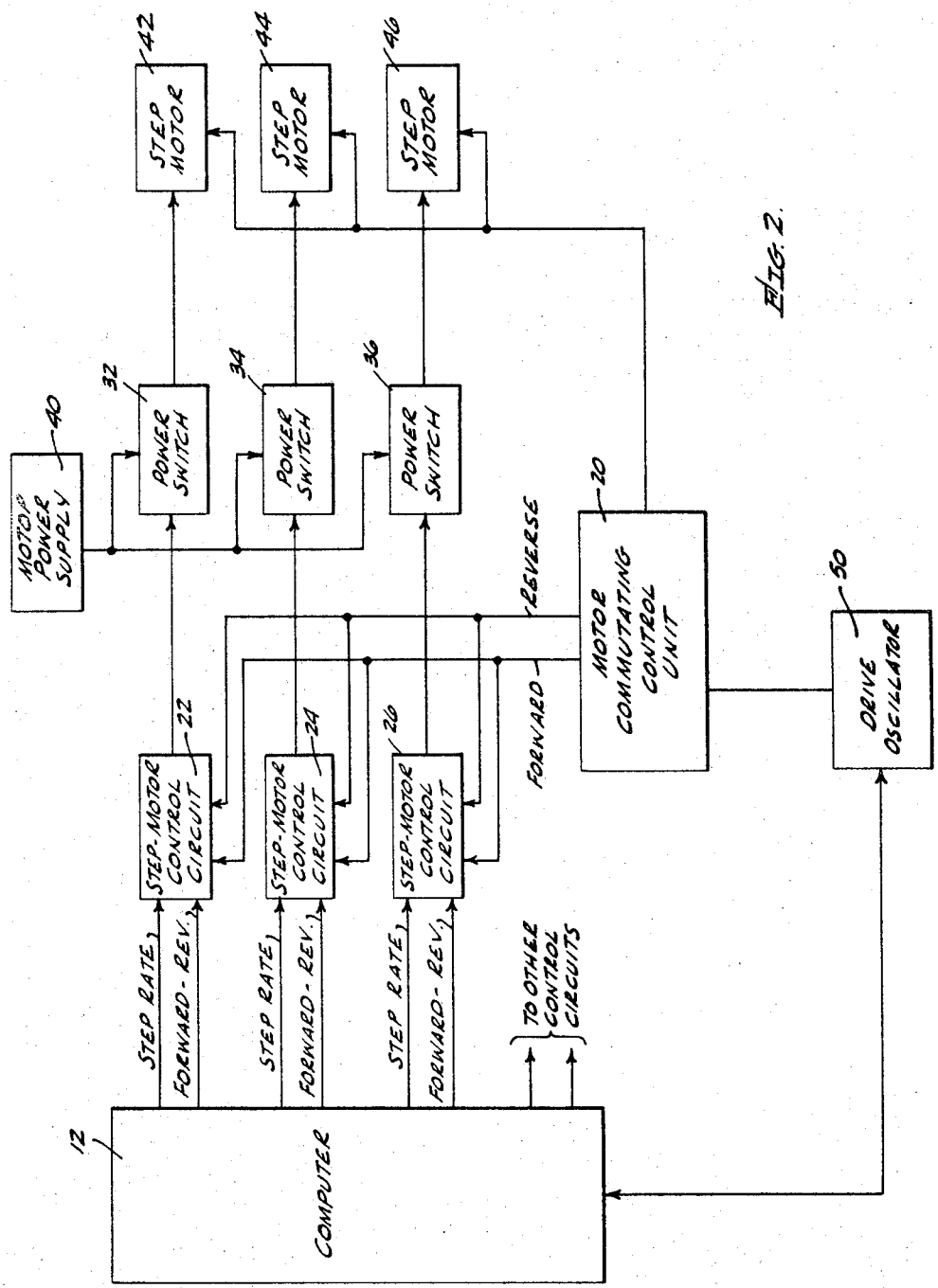
FIGURE 2 is a more detailed block diagram of the present invention.

FIGURE 2 is a block diagram of a step motor control system in accordance with the present invention. It includes step motor control circuits 22, 24 and 26 coupled to power switches 32, 34 and 36 respectively. These are assumed to be included in block 18 of FIGURE 1. There are as many control circuits and power switches as there are step motors to be controlled. A motor power supply 40 is used to provide power to step motors 42, 44 and 46 through switches 32, 34 and 36 respectively. Power is supplied to each motor only when its respective switch is enabled by a signal from its associated control circuit.

The step motor control system also includes a drive oscillator 50, providing clock pulses to the motor commutating control unit 20, which is coupled to each of motors 42, 44 and 46. Briefly described, the function of unit 20 is to define a sequence of stepping time intervals produced at a selected stepping rate R and energize the motors so that during each alternate stepping interval each of the motors is capable of being rotated in the same direction, i.e., either forward or a reverse direction. That is, during each odd interval in the sequence, each of the step motors is connected so that if power is supplied thereto through its associated power switch from power supply 40, the motor will turn in a forward direction. Then during every even interval in the sequence, each motor is connected to turn in a reverse direction if power is supplied thereto from the power supply 40 through its respective power switch.

From the foregoing, it is thus seen that during any one stepping interval, all the motors are rotatable in one direction and during a succeeding interval, they are rotatable in an opposite direction. However, whether any or all of the motors rotate at any given interval depends on whether its or their respective power switches are enabled by their control circuits. Each of the control circuits (22, 24 and 26) is separately controlled by the computer 12 which determines which motor to turn in what direction and at what rate.

As seen from FIGURE 2, each control circuit is connected to the computer by two lines designated Forward-Reverse and Step-Rate. The Step-Rate line is used to provide the control circuit with signals, hereafter referred to as stepping signals, which are supplied at a rate at which the associated motor is to be stepped. The Forward-Reverse line is used to control the control circuit in such a way that the proper stepping direction is achieved. Unit 20 is connected to each of the control circuits 22, 24 and 26 by means of Forward and Reverse lines to synchronize their operations so that when a stepping signal and forward direction indicating singal are supplied to any control circuit from the computer, its associated power switch is enabled during the stepping interval, when the motors are connected to step forward, so that the associated motor steps forward. Also, when a stepping signal and a reverse direction indicating signal are supplied to any control circuit from the computer, its associated power switch is enabled during the stepping interval when the motors are connected to step in a reverse direction so that the direction of stepping of the associated motor is reversed.

In summarizing the system described, the commutating control unit 20 controls all the step motors to be connected during odd stepping intervals to be rotated in a forward direction while being connected during even stepping intervals to rotate in a reverse direction. However which of the motors rotates in a forward direction during an odd interval depends on the signals supplied to its associated control circuit from the computer. For a motor to rotate in a forward direction, the computer provides its associated control circuit with a stepping signal on the Step-Rate line and a forward direction indicating signal on the Forward-Reverse line. On the other hand, for a motor to step in a reverse direction during an even stepping interval, its associated control circuit need be provided with a stepping signal on the Step-Rate line and a reverse direction indicating signal on the Forward-Reverse line. Synchronization of the signals from the computer 12 and unit 20 is achieved by the computer 12 controlling oscillator 50, which provides the clock pulses, used to generate the stepping intervals, as will be explained hereafter.

While any one of presently available step motors may be employed, it is preferred to use motors known as bifilar synchronous motors for process control purposes. Such a motor has a permanent magnet or armature and has two field windings. Half of each field winding is wound on the other half and in the opposite direction so that the motor can be stepped by switching from one half of the winding to the other half rather than by changing the polarity of the applied potential.

Figure 3:
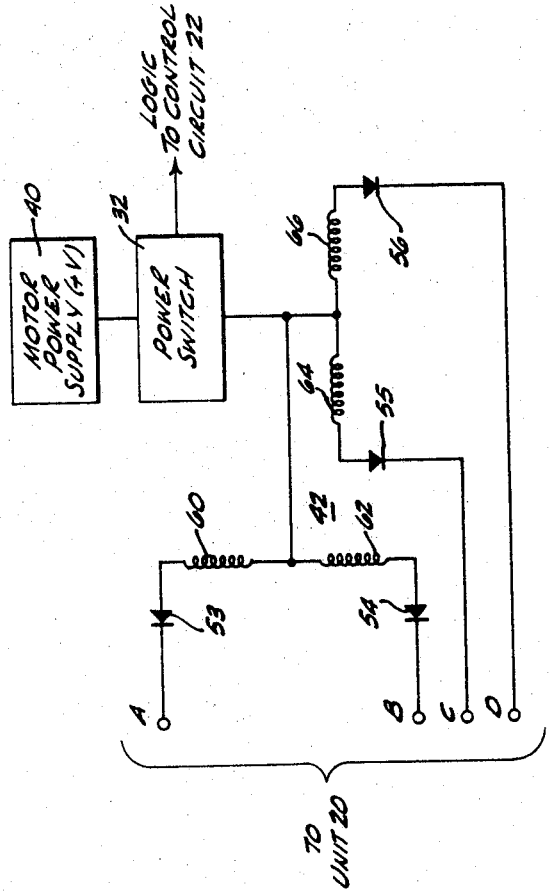
FIGURE 3 is a schematic diagram of a step motor.

Referring to FIGURE 3, there is shown in schematic form, a bifilar synchronous motor, assumed to represent step motor 42. The input terminals to the bifilar windings designated A, B, C and D are shown connected to unit 20. Diodes 53, 54, 55 and 56 are connected between the terminals A, B, C and D and one end of the respective bifilar windings 60, 62, 64 and 66 to isolate motor 42 from other motors coupled to unit 20 at the same terminals A, B, C and D. The other ends of the windings are tied together to the power switch 32 which controls the supply of power from power supply 40 to the motor as a function of the signals from control circuit 22. For explanatory purposes, power supply 40 is assumed to represent a source of positive potential +V.

As is appreciated by those familiar with bifilar motors, a sequence of four signals is required for a full forward or reverse step. That is, with power supply 40 providing motor 42 with +V potential, terminals A, B, C and D are connected to a reference potential such as ground in a sequence of four different combinations to step the motor by a full step. The order of the combinations in the sequence controls the motor's direction of stepping, i.e., forward or reverse. The commutation sequence for forward and reverse is shown in the following Table I. Therein, the ones or zeroes underneath each one of the letters which heads a column designates whether or not the particular terminal is connected to ground.

TABLE I

|  |  | A | B | C | D |
|---|---|---|---|---|---|
| Initial state |  | 1 | 0 | 1 | 0 |
| Forward stepping | 1 | 0 | 1 | 1 | 0 |
|  | 2 | 0 | 1 | 0 | 1 |
|  | 3 | 1 | 0 | 0 | 1 |
|  | 4 | 1 | 0 | 1 | 0 |
| Reverse stepping | 1 | 1 | 0 | 0 | 1 |
|  | 2 | 0 | 1 | 0 | 1 |
|  | 3 | 0 | 1 | 1 | 0 |
|  | 4 | 1 | 0 | 1 | 0 |

Reference is now made to FIGURES 4 and 5. FIGURE 4 is a schematic and block diagram of one embodiment of the invention in conjunction with bifilar motors, and FIGURE 5 is a diagram of waveforms useful in explaining the arrangement of FIGURE 4.

Assuming that a time interval $1/R$ is required for stepping a motor by a full step, oscillator 50 is selected to provide clock pulses 71 at a frequency of $4R$ pulses per sec. (p.p.s.) generated at times $t_1$ through $t_n$. Pulses 71 are diagrammed in line $a$ of FIGURE 5. Thus the clock period is $\frac{1}{4}R$. These clock pulses are supplied to a frequency divider 70 which provides output signals or pulses 72 at a frequency of $R/2$ p.p.s. Each of pulses 72 which has a period of $2/R$ seconds has a positive half and a negative half. The output of the divider may be thought of as true during the positive half of each cycle and false during the negative half as designated by $72t$ and $72f$ in line $b$ of FIGURE 5. The alternating true and false outputs of divider 70, each being of a time interval $1/R$ equal to the motor's stepping interval, may be regarded as a sequence of stepping intervals in which every odd interval is true and every even interval is false.

As seen in FIGURE 4, the output of oscillator 50, i.e., clock pulses 71 are supplied to one input terminal of each of AND gates 74 and 75. The output of divider 70 representing pulses 72 is supplied to another input of gate 74 as well as to an inverter 76, the output of which is supplied to the other input terminal of gate 75. From the arrangement of FIGURE 4 and the waveforms on lines $a$ and $b$ of FIGURE 5, it should be appreciated that during every interval R, when the output of divider 70 is true, gate 74 is enabled four times when four clock pulses 71 are supplied thereto from oscillator 50, providing four pulses to commutator control logic 72. During this period or interval, gate 75 is disabled since the output of inverter is false. On the other hand, during every false output interval ($72f$) of divider 70, gate 74 is disabled since the input thereto from the divider is false. However the input to gate 75 from inverter 76 is true so that when the four clock pulses 71 are supplied to gate 75, it is enabled to provide logic 72 with four discrete pulses. Thus, during every true or odd stepping interval, logic 72 is provided with four pulses from gate 74 and during every false or even interval, four pulses are supplied thereto from gate 75.

In accordance with the invention, the pulses from gate 74 are used in the control logic 72 to perform the commutating sequence necessary for a forward stepping as shown in Table I, while the gate 75 controls logic 72 to provide the sequence necessary for reverse stepping. Hereafter gates 74 and 75 will also be referred to as the forward and reverse control gates respectively. It is thus seen that oscillator 50, divider 70, together with inverter 76 and gates 74 and 75, control the control logic 72 so that during every odd stepping interval the motor 42, as well as any other motors connected to terminals A, B, C and D, are actuated in a four combination sequence so that if power is supplied thereto, the motor or motors step forward. Then during every even stepping interval, a four combination sequence is provided to step the motors in reverse when power is supplied thereto through their respective power switches 32, 34, 36. As previously explained, each power switch such as switch 32, is controlled by its respective control circuit, such as 22, schematically diagrammed in FIGURE 4. It includes AND gates 84 and 85, each having three input terminals designated K, L and M. The output terminals of the gates are connected to an OR gate 86, whose output when true enables power switch 32 to provide power to motor 42.

The control circuit 22 also includes a bistable element, such as a flip-flop 88, having one of its output lines designated T connected to terminal K of gate 84 and another output line designated F connected to terminal K of gate 85. The flip-flop is controlled by the computer 12 through the Forward-Reverse line. When motor 42 is to be stepped forward, the flip-flop is set by the computer so that its output on line T, connected to terminal K of gate 84, is at a true level. However when the motor is to be stepped in reverse, the flip-flop is reset so that line F and terminal K of gate 85 are at a true level. The outputs of divider 70 and inverter 76 are connected to the L terminals of gates 84 and 85 respectively while the M terminals of both gates are tied to the Step-Rate line which provides stepping pulses to the control circuit 22 from the computer.

It is appreciated that for either of gates 84 or 85 to be enabled, all its three input terminals must be true. Gate 84 can only be enabled during each odd stepping interval representing a forward stepping interval. It is enabled only if the computer directs motor 42 to be rotated forward by setting line T of flip-flop 88 to true and providing a true stepping signal via the Step-Rate line. Gate 85 on the other hand can only be enabled during each even stepping interval representing a reverse stepping interval. It is enabled only if the computer resets flip-flop 88 so that its output line F is true and a true stepping signal is provided via its Step-Rate line. Thus control circuit 22, by means of the signals from the computer, controls whether a motor associated therewith is to be stepped and in what direction. However, the direction in which the motors may be rotated during any stepping interval is controlled by the commutating sequence provided by control logic 72.

The following examples are included to further illustrate the operation of the novel system of the invention. Referring to lines $c$ and $d$ of FIGURE 5, let it be assumed that the computer provides a forward direction indicating signal, setting flip-flop 88 so that its output line T is true between $t_1$ and $t_x$ as indicated by pulse 92 in line $c$. Also, the computer provides a true stepping signal 94 (line $d$) which continuously remains at a true level to produce a maximum stepping rate or velocity. Then, from the foregoing, it is appreciated that between times $t_1$ and $t_5$, the three inputs of gate 84 are true enabling the gate which in turn enables OR gate 86 by setting its output to true. This in turn enables power switch 32 so that during this time interval positive potential is supplied to motor 42. And, since during this interval the control logic 72 provides terminals A, B, C and D of motor 42 with a forward commutation sequence, motor 42 steps forward one full step. Similar forward stepping occurs during the forward stepping interval between $t_{10}$ and $t_{14}$.

Then at time $t_x$, the flip-flop 88 is reset as indicated by line 96 so that its output line F is true. Thus, forward stepping is inhibited during the time interval $t_x$–$t_y$. However, reverse stepping occurs during the reverse stepping interval $t_y$–$t_z$, since during such interval the three inputs to gate 85 are true and control logic 72 provides the motor with a reverse stepping commutation sequence. Similar reverse stepping occurs during reverse stepping interval $t_{n-x}$ and $t_{n-1}$.

As long as the stepping signal 94 remains continuously true, maximum stepping rate or velocity is achieved with the direction of stepping being controlled by the state of flip-flop 88. The stepping velocity may be reduced by controlling the rate of stepping signals from the computer. In line *e* of FIGURE 5, true stepping signal 97 will cause the forward stepping of the motor during interval $t_1-t_5$, whereas signal 98 will result in motor 42 stepping in reverse during interval $t_y-t_z$. However no stepping in either direction will occur during intervals $t_{10}-t_x$ and $t_z-t_{n-1}$, since during these intervals the computer does not provide a true stepping signal.

In summarization, in accordance with the teachings of the invention, means such as commutator control logic 72 and associated circuitry, are provided to commutate all the motors in such a way that during each odd stepping interval, each of the motors can rotate in a forward direction while during every even interval, each motor can rotate in a reverse direction. Which motor rotates in what direction and at what rate is controlled by its associated control circuit. The latter circuit, responsive to signals from the computer, controls the enabling of a power switch, through which power is suppliable to the motor. The signals from the computer include a stepping direction signal, i.e., whether the motor should step forward or in reverse and stepping signals at a selected step rate to control the rate or velocity at which the motor is stepped.

It is appreciated that those familiar with the designing logic circuitry may employ various arrangements to generate the necessary four combination commutation sequences as outlined in Table I in response to the four signals from gates 74 and 75, so that in response to the signals from gate 74, the forward stepping sequence is generated, while the reverse stepping sequence is produced in response to the signals from gate 75.

Figure 7:
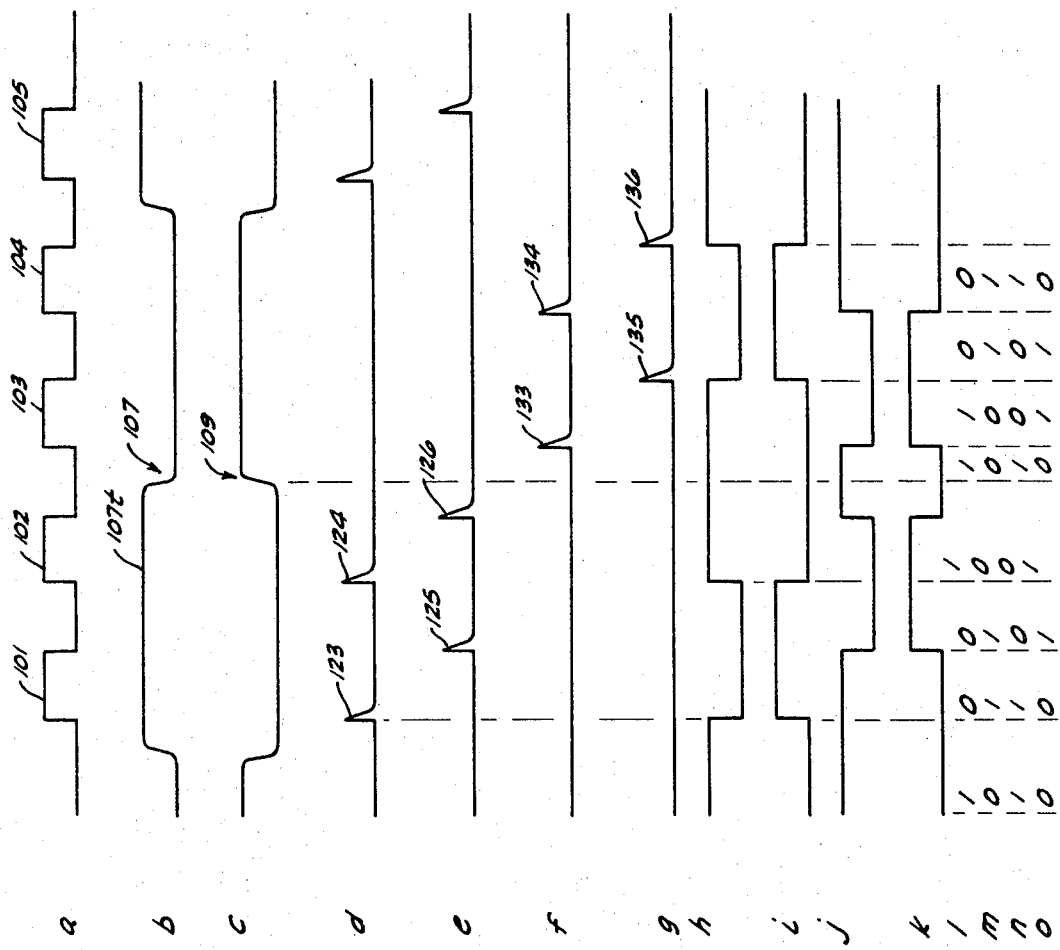
FIGURE 7 is a diagram of waveforms useful in explaining the circuitry shown in FIGURE 6.

One example of a commutator control logic, which requires only two clock pulses such as 71 (line *a*, FIGURE 5) during each stepping interval to produce the desired four combination commutation sequences, is diagrammed in FIGURE 6, to which reference is made herein. FIGURE 7 is a diagram of waveforms useful in explaining the embodiment shown in FIGURE 6. In line *a* of FIGURE 7 pulses 101 through 105 represent the clock pulses of oscillator 50 (FIGURE 4) and reference numerals 107 and 109 in lines *b* and *c* respectively, represent the respective outputs of divider 70 and inverter 76. When 107 is true, it defines a forward stepping interval and when 109 is true, it defines a reverse stepping interval. Pulses 101 through 105 are supplied to the inputs of an inverter 110 (FIGURE 6) and a differentiator 112, while the output (107) of divider 70 is supplied to one input of each of AND gates 114 and 115 and the output (109) of inverter 76 is supplied to one input of each of gates 116 and 117. The output of differentiator 112 is connected to the other input of each of gates 114 and 117, while the output of another differentiator 122 having its input connected to inverter 110 is supplied to the other inputs of gates 115 and 116.

It is appreciated that during a true output of divider 70 representing a forward stepping interval, designated in line *b* by 107*t*, gate 114 is enabled by the leading edges of pulses 101 and 102 providing output pulses 123 and 124 (line *d*) while during the same period, the trailing edges of pulses 101 and 102 enable gate 115 to provide pulses 125 and 126 (line *e*). Thus pulses 101 and 102 are converted into four discrete pulses. Similarly, during the reverse stepping interval defined by the true output 109*t* (line *c*, FIGURE 7) of inverter 76 (FIGURE 4), gate 117 is enabled by the leading edges of pulses 103 and 104 to provide pulses 133 and 134 (line *f*) and by the trailing edges to provide pulses 135 and 136 (line *g*). The outputs of gates 114 and 116 are ORed in an OR gate 142 and an OR gate 143 is used to combine the outputs of gates 115 and 117.

The arrangement also includes two flip-flops 144 and 146 having their set inputs connected to the outputs of AND gates 144a and 146a respectively, and their reset inputs connected to the outputs of AND gates 144b and 144a respectively, each having another of its inputs connected to gate 142. Similarly, the output of gate 143 is supplied to one input of each of gates 146a and 146b, with another other input of the gates respectively coupled to the false and true output terminals of flip-flop 146. The true output terminals of 144 and 146 are connected to input terminals $A_D$ and $C_D$ output drivers 150 while the false terminals of the two flip-flops are connected to terminals $B_D$ and $D_D$ of drivers 150.

The function of drivers 150 is to connect the input terminals A, B, C and D of the motors to ground as a function of the levels of the input terminals thereof connected to flip-flops 144 and 146. In FIGURE 7, lines *h*, *i*, *j* and *k* represent the true and false levels at terminals $A_D$, $B_D$, $C_D$ and $D_D$, respectively, as a function of the setting and resetting of flip-flops 144 and 146 by pulses 123 through 126 and 133 through 136. Whenever any input terminal of drivers 150 is true, its corresponding output is grounded. Thus, as seen from lines *l* through *o* of FIGURE 7, the changes in the levels of the input terminals $A_D$ through $D_D$ corresponds to the desired four combination commutating sequences, necessary to step the bifilar winding motors in either a forward or reverse direction.

There has accordingly been shown and described herein a novel motor control arrangement for use in a process control system wherein each motor is to be controlled to rotate or step at a desired rate in either of two directions. It is appreciated that those familiar with the art may make modifications or substitute equivalents in the specific arrangements hereinbefore described without departing from the spirit of the invention. Therefore, all such modifications and/or equivalents are deemed to fall within the scope of the invention.

What is claimed is:

1. In a process control system of the type wherein a transducer generates a signal which is a function of a condition upon which control of the process is based, a motor rotatable in forward and reverse directions for controlling said condition, and a computer including means for converting the transducer signal to control signals representing direction and rate of rotation of said motor required to control said condition, an improved motor control system comprising:

a source of clock pulses;
means responsive to said clock pulses for generating interval defining signals to define a sequence of alternating odd and even intervals;
motor means coupled to said motor for controlling the direction of rotation of said motor to be in a forward direction during each odd interval and in a reverse direction during each even interal; and
means including a source of power and motor control means responsive to the control signals from said computer for selectively energizing said motor with power from said source as a function of said control signals representing the required direction and rate of rotation of said motor to control said condition.

2. In a process control system as recited in claim 1 wherein said control signals from said computer include a direction control signal representing the required direction of rotation of said motor and a rotation signal supplied at a selected rate representing the required rate of rotation of said motor, said motor control means including gating means to energize said motor with power from said source during an odd interval when said computer provides a rotation signal and a direction control signal representing a forward direction of rotation and for energizing said motor with power during an even interval when said computer provides a rotation signal and a direction control signal representing a reverse direction of rotation.

3. In a process control system as recited in claim 1 wherein said motor is a stepping motor for stepping forward a selected increment of a full rotation in response to a first four combination commutating sequence when energized by power from said power supply and for stepping in reverse by said selected increment in response to a second four combination commutating sequence, said motor means including gating means responsive to said clock pulses and said interval defining signals for providing said motor with said first four combination commutating sequence during each odd interval and with said second four combination commutating sequence during each even interval.

4. In a process control system as recited in claim 3 wherein the control signals from said computer include a stepping direction control signal representing the required direction of stepping of said motor and a stepping signal supplied at a selected rate representing the required rate of stepping of said motor, said motor control means including gating means to energize said motor with power from said power source during an odd interval when said computer provides a stepping signal and a stepping direction control signal representing a forward direction and for energizing said motor with power during an even interval when said computer provides a stepping signal and a stepping direction control signal representing a reverse direction.

5. A control system comprising:
   a plurality of motors, each having a first input terminal and a plurality of second input terminals the motor being caused to step a selected increment of a full revolution in a selected stepping interval by the application of power between said first input terminal and successive combinations of ones of said second input terminals said combinations being in a first sequence for stepping the motor in a forward direction and in a second sequence for stepping said motor in a reverse direction;
   a source of power for operating said motors;
   means for defining a sequence of alternating odd and even stepping intervals;
   commutator means for successively combining the ones of said second input terminals of said plurality of motors in said first sequence of combinations during each odd stepping interval and in said second sequence of combinations during each even stepping interval; and
   selective control means for selectively coupling the first terminals of motors which is to be desired to step in a forward direction to said source of power during an odd stepping interval and for selectively coupling the first terminals of motors which it is desired to step in a reverse direction to said source of power during an even stepping interval.

6. The control system defined in claim 5 wherein said means for defining comprises a source of clock pulses;
   means responsive to said clock pulses for generating interval defining signals, each of a period $2/R$, the positive half of each interval defining signal defining an odd stepping interval and each negative half defining an even stepping interval; and
   first gating means responsive to the positive and negative halves of each interval defining signal and said clock pulses for providing said commutator means during each odd interval with a first plurality of pulses for successively combining the ones of said second input terminals of said plurality of motors in said first sequence and for providing said commutator means during each even interval with a second plurality of pulses for successively combining the ones of said second input terminals of said plurality of motors in said second sequence.

7. The control system defined in claim 6 wherein said selective control means comprise a separate motor control circuit and a separate power control switch for each of said plurality of motors, each motor control circuit including second gating means responsive to each interval defining signal, to a stepping direction control signal and to a stepping control signal, for enabling the power control switch associated therewith during an odd interval when a stepping control signal and a stepping direction control signal representing a forward stepping direction are supplied thereto and for enabling said power control switch during an even interval when a stepping control signal and a stepping direction control signal representing a reverse stepping direction are supplied thereto, and means for coupling the first input terminal of the motor associated with said power switch to said power source when said power control switch is enabled.

References Cited

UNITED STATES PATENTS

| | | | |
|---|---|---|---|
| 3,174,087 | 3/1965 | Hannicq et al. | 318—85 XR |
| 3,268,785 | 8/1966 | Gerber et al. | 318—102 XR |

ORIS L. RADER, *Primary Examiner.*

GLEN SIMMONS, *Assistant Examiner.*

U.S. Cl. X.R.

318—102, 103, 281